US011762747B2

(12) United States Patent
Itkin

(10) Patent No.: US 11,762,747 B2
(45) Date of Patent: Sep. 19, 2023

(54) NETWORK BASED DEBUG

(71) Applicant: Mellanox Technologies, Ltd., Yokneam (IL)

(72) Inventor: Yuval Itkin, Zoran (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 368 days.

(21) Appl. No.: 17/003,437

(22) Filed: Aug. 26, 2020

(65) Prior Publication Data
US 2022/0066895 A1 Mar. 3, 2022

(51) Int. Cl.
G06F 11/00 (2006.01)
G06F 11/22 (2006.01)
G06F 9/4401 (2018.01)
H04L 43/50 (2022.01)
G06F 21/60 (2013.01)
G06F 13/40 (2006.01)
G06F 11/273 (2006.01)

(52) U.S. Cl.
CPC ........ G06F 11/2294 (2013.01); G06F 9/4401 (2013.01); G06F 11/22 (2013.01); G06F 13/4063 (2013.01); G06F 21/606 (2013.01); H04L 43/50 (2013.01); G06F 11/2733 (2013.01)

(58) Field of Classification Search
CPC ............ G06F 11/2294; G06F 11/2733; G06F 11/079; G06F 11/22
USPC ...................................................... 714/1–57
See application file for complete search history.

(56) References Cited

U.S. PATENT DOCUMENTS

| 6,377,691 B1 | 4/2002 | Swift et al. |
| 7,216,257 B2 | 5/2007 | Kilian |
| 8,201,149 B1 | 6/2012 | Gumtow et al. |
| 8,769,495 B1* | 7/2014 | Gupta ................. G06F 11/3656 717/124 |
| 9,678,682 B2 | 6/2017 | Lobo et al. |
| 2006/0029016 A1* | 2/2006 | Peles ..................... H04L 43/106 370/328 |
| 2007/0011507 A1* | 1/2007 | Rothman ............ G06F 11/2736 714/E11.174 |
| 2007/0016827 A1* | 1/2007 | Lopez ................... G06F 11/261 714/31 |
| 2008/0270827 A1 | 10/2008 | Brandyberry et al. |
| 2011/0307871 A1 | 12/2011 | Branda et al. |

(Continued)

FOREIGN PATENT DOCUMENTS

CN 104021060 A 9/2014
WO 2019009976 A 1/2019

OTHER PUBLICATIONS

DMTF, "Network Controller Sideband Interfacce (NC-SI) Specification," document DSP0222, version 1.1.0, pp. 1-138, Sep. 23, 2015.

Primary Examiner — Sarai E Butler
(74) Attorney, Agent, or Firm — KLIGLER & ASSOCIATES PATENT ATTORNEYS LTD

(57) ABSTRACT

A compute node includes a network-connected device, and a baseboard management controller (BMC) that is connected to the network-connected device by a sideband interface. The network-connected device is configured to communicate with a network. The BMC is configured to configure the network-connected device, via the sideband interface, to engage in a debug session over the network with a remote debug device.

18 Claims, 2 Drawing Sheets

(56) References Cited

U.S. PATENT DOCUMENTS

| | | | | |
|---|---|---|---|---|
| 2014/0189775 A1* | 7/2014 | Burch | ............... | H04L 63/10 |
| | | | | 726/1 |
| 2017/0083393 A1* | 3/2017 | Datta | ............... | G06F 11/2635 |
| 2017/0111215 A1 | 4/2017 | Chou et al. | | |
| 2018/0293147 A1* | 10/2018 | Bikumala | ............... | G06N 20/00 |
| 2021/0192085 A1* | 6/2021 | Shah | ............... | G06F 11/3656 |

* cited by examiner

NETWORK BASED DEBUG

FIELD OF THE INVENTION

The present invention relates generally to communication networks, and particularly to remote debugging and diagnostics of network devices.

BACKGROUND OF THE INVENTION

Network-connected devices such as network interface controllers, host channel adapters, network-enabled graphic processor units (GPUs), network switches or routers, typically communicate with communication networks such as Ethernet or InfiniBand™. Since a malfunction of a network-connected device may affect network communication, remote debugging of the network devices through the network may be challenging.

U.S. Pat. No. 8,201,149 describes a system and a method for the remote execution of a program such as a debugger, using a remote management module. A packet daemon executing on the remote management module packetizes data received from a client and forwards it to a packet daemon executing on a computer, which receives the packet and forwards data contained therein to the program; data from the program is packetized by the packet daemon executing on the computer and transmitted to the packet daemon executing on the remote management module, which forwards the data to a program specific daemon on the remote management module for forwarding to the client.

PCT International Publication WO 2019/009976 discloses techniques and apparatus for remotely accessing debugging resources of a target system, including physical compute resources, such as processors and a chipset that can be coupled to a controller remotely accessible over a network; the controller can be arranged to facilitate remote access to debug resources of the physical compute resources; the controller can be coupled to debug pin, such as a debug port and arranged to assert control signals on the pins to access debug resources. The controller can also be arranged to exchange information elements with a remote debug host to include indication of debug operations and/or debug results.

SUMMARY OF THE INVENTION

An embodiment of the present invention that is described herein provides a compute node including a network-connected device, and a baseboard management controller (BMC) that is connected to the network-connected device by a sideband interface. The network-connected device is configured to communicate with a network. The BMC is configured to configure the network-connected device, via the sideband interface, to engage in a debug session over the network with a remote debug device.

In some embodiments, the BMC is configured to send to the network-connected device one or more parameters for connection with the remote debug device. In various embodiments, the one or more parameters include at least one network parameter selected from a group of network parameters consisting of: a physical-layer source address; a physical-layer destination address; an Internet Protocol (IP) source address; an IP destination address; a port number; and a Virtual Local Area Network (VLAN) parameter. In a disclosed embodiment, the one or more parameters include a secure debug-enablement token, for establishing the debug session with the remote debug device.

In some embodiments, the compute node further includes a Central Processing Unit (CPU) that is configured to provide the one or more parameters to the BMC, for sending to the network-connected device. In an example embodiment, the CPU is connected to the network-connected device via a bus, and the BMC is configured to send the one or more parameters to the network-connected device over the sideband interface when the network-connected device is unable to communicate over the bus.

In some embodiments, the BMC is configured to query from the network-connected device a challenge parameter and, responsive to the challenge parameter, to send to the network-connected device a secure debug-enablement token, for establishing the debug session with the remote debug device. In an embodiment, the BMC is configured to send to the network-connected device a 'set-token' command over the sideband interface, the set token command including a payload that includes the secure debug-enablement token.

In various embodiments, the sideband interface may include at least one of Network Controller Sideband Interface (NC-SI), System Management Bus (SMBus), Reduced media-independent interface (RMII), RMII Based Transport (RBT) and PCIe Bus.

There is additionally provided, in accordance with an embodiment of the present invention, a method including, in a compute node, communicating with a network using a network-connected device. Communicating is also made in the compute node, over a sideband interface, between the network-connected device and a baseboard management controller (BMC), the communicating including configuring the network-connected device by the BMC, via the sideband interface, to engage in a debug session over the network with a remote debug device.

The present invention will be more fully understood from the following detailed description of the embodiments thereof, taken together with the drawings in which:

DETAILED DESCRIPTION OF EMBODIMENTS

Overview

Figure 1:
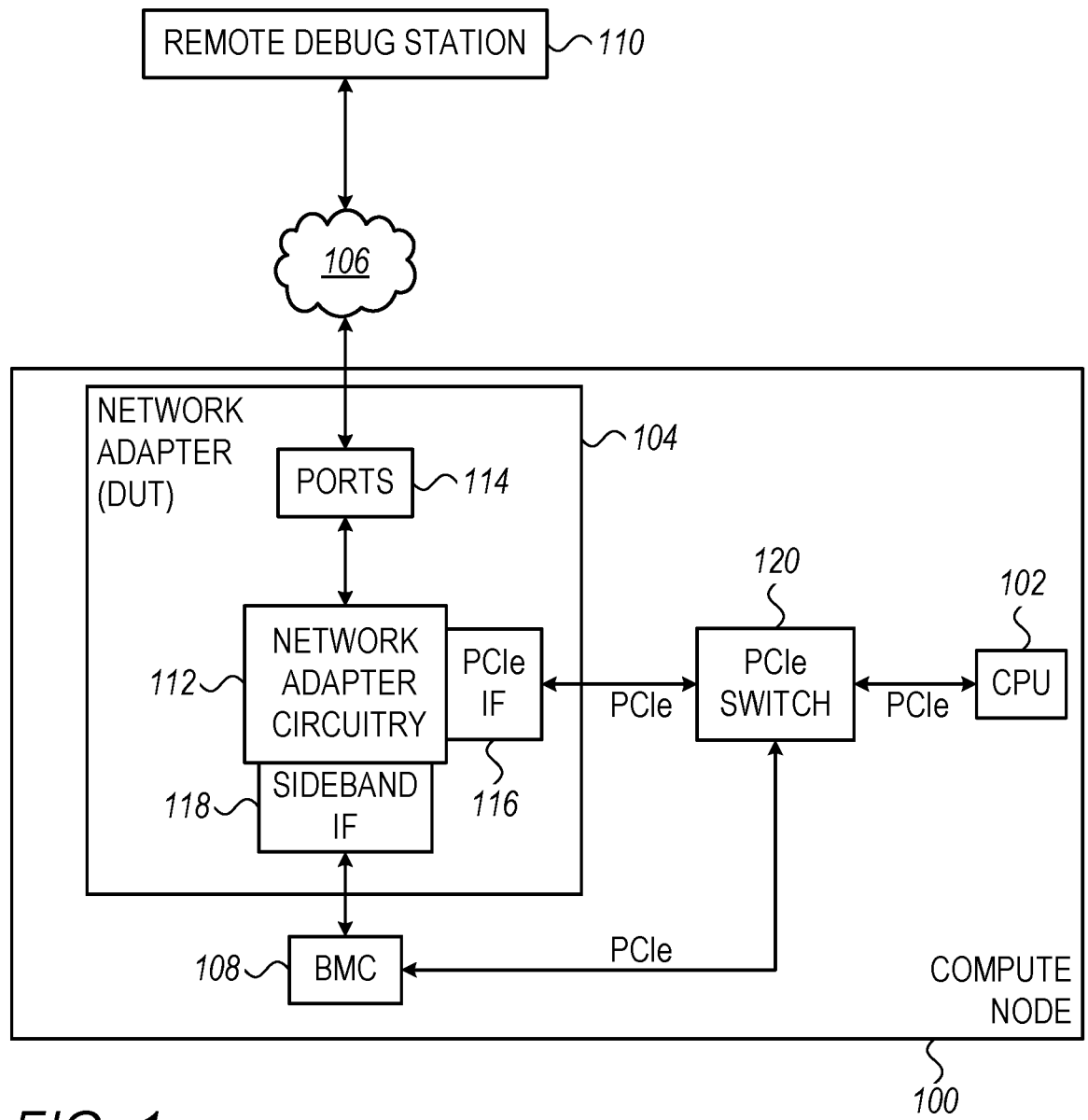
FIG. 1 is a block diagram that schematically illustrates remote debugging of a Compute Node, in accordance with an embodiment of the present invention.

Compute nodes are often coupled to a communication network through a network-connected device such as a Network Interface Controller (NIC), network-enabled graphic processor unit (GPU) or a Host Channel Adapter (HCA). The network-connected device may be debugged through a host interface (e.g. a Peripheral Component Interconnect Express, (PCIe)) or through a dedicated debug bus. However, in those cases, the debugging session is limited to the location of the compute node. Moreover, the host interface or the dedicated debug bus that are used for the debug must not be faulty.

Advantageously, network-connected devices, (which will be sometimes referred to hereinbelow as Device Under Test, or DUT) may be debugged through the network connection, allowing the debug hardware/software (which will be referred to as the Debug Station) and/or the network debug technicians to be remote from the DUT.

However, to facilitate debug through the network connection of the DUT, two main obstacles need to be solved. First, the network connection parameters for the debug session must be provided to the DUT, preferably not through the host interface (which may be faulty). Secondly, the debug session should be secure, so that hackers will not be able to take advantage of the vulnerability of debug tasks, e.g., to access sensitive information or to install malware.

Embodiments according to the present invention provide methods and apparatuses that allow over-the-network debug of DUTs, using a baseboard management controller (BMC) that is coupled to the DUT (and may also be used for system monitoring and management). (We will refer hereinbelow interchangeably to Network-Connected devices and DUTs.)

In an embodiment, the BMC communicates with the network-connected device using a sideband interface such as Network Controller Sideband Interface (NC-SI). (NC-SI is described in "Network Controller Sideband Interface (NC-SI) Specification", Distributed Management Task Force, Inc. (DMTF), document DSP0222, version 1.1.0, 23 Sep. 2015; this document will be referred to hereinbelow as the "DSP0222".)

In an embodiment, to initiate a debug session, a user communicates with the network-connected device through the BMC, which communicates with the DUT. In an embodiment, the user invokes a program that runs on the CPU and communicates with the BMC, which functions as a bridge between the user's program and the network-connected device; in another embodiment, the user's program runs on a remote computer and communicates with the BMC over the network. According to an embodiment, the BMC communicates with the network-connected device using a set of commands and responses that are compliant with the DSP0222, including setting the debug network parameters (such as IPv4 or IPv6 addresses of the debug station and the DUT), and including authentication of the user by the network-connected device (through the BMC).

System Description

According to embodiments of the present invention, a user (e.g., a network service engineer) wishes to initiate a remote debug session of a network-connected device, that is coupled to a network from a remote debug station that is also coupled to the same network. The compute node typically comprises a CPU, and a network-connected device. In embodiments, the compute node further comprises a Baseboard-Management-Controller (BMC), and, to initiate the debug session, the user communicates with a network-connected device of the compute node through the BMC.

FIG. 1 is a block diagram that schematically illustrates remote debugging of a Compute Node 100, in accordance with an embodiment of the present invention.

Compute Node 100 comprises a Central Processing Unit (CPU) 102, a network-connected device (in the present example a Network Adapter 104) which is configured to communicate with a Network 106 (e.g., Ethernet of Infini-Band™), and a Baseboard Management Controller (BMC) 108. The embodiments described herein refer mainly to a network adapter, e.g., a NIC or HCA, but this choice is made purely for the sake of conceptual clarity. In alternative embodiments, the network-connected device may comprise, for example, a GPU having an integral network connection, a network adapter having an embedded CPU, or any other suitable type of network-connected device.

CPU 102 is configured to control and monitor Network Adapter 104; for example, the CPU may send to the network adapter commands pertaining to the egress and ingress of communication packets, receive from the network adapter command responses, send payloads of egress packets to the network adapter and receive payloads of ingress packets from the network adapter (other information may typically be conveyed between the CPU and the network adapter; such information will not be mentioned herein, for brevity).

The debugging is aimed to locate and analyze faults in Network Adapter 104, which will be sometimes referred to hereinbelow as the Device Under Test (DUT). According to the example embodiment illustrated in FIG. 1, the DUT may be debugged by a Remote Debug Station 110, which is also coupled to Network 106.

Network Adapter 104 comprises a Network Adapter Circuitry 112, which is configured to govern packet traffic between CPU 102 and Network 106, Ports 114 (comprising at least one Ingress port and one Egress port, or a single combined Ingress/Egress port), which are configured to physically interface with the network, a Peripheral Component Interconnect Express (PCIE) Interface 116 and a Sideband Interface 118.

According to the example embodiment illustrated in FIG. 1, interconnect communication within Compute Node 100 is mainly done using a PCIE bus. Compute Node 100 further comprises a PCIE Switch 120, which is configured to govern PCIE transactions within the compute note. Network Adapter 104 is coupled to PCIE Switch 120 through PCIE Interface 116, whereas CPU 102 and BMC 108 are coupled to PCIE Switch 120 via PCIE ports (not shown).

BMC 108, which may be embedded, for example, in the motherboard of the compute node (the motherboard is not shown), is operable to manage the interface between system-management software and platform hardware. The BMC is coupled to Network Adapter 104 through Sideband Interface 118, using a bus such as a System Management Bus (SM-Bus) or Reduced media-independent interface (RMII) Based Transport (RBT). BMC 108 is coupled through a PCIE port of the BMC to PCIE Switch 120, and, through PCIE Switch 120, to CPU 102 (BMC 108 may also connect through PCIE switch 120 to the Network Adapter 104 through PCIe interface 116). (In some embodiments, since PCIe is a point-to-point bus, PCIE Switch 120 may be missing. Instead, PCIE Interface 116 and BMC 108 may be directly coupled to two PCIE ports of CPU 104.)

To facilitate remote debug of the DUT by Remote Debug Station 110 over Network 106, communication parameters such as MAC address, internet address, User Datagram Protocol (UDP) source/destination ports and other parameters (some of which will be described below, with reference to a second example embodiment) should be sent to the network adapter. According to the example embodiment illustrated in FIG. 1, BMC 108 sends the communication parameters to the network adapter through the network adapter's sideband interface, e.g., using SMBus or using RMII.

To assure that the remote debug session is securely entered, the BMC queries a security question ("challenge") from the network adapter, and responds by sending a corresponding security answer ("token") to the network adapter; the challenge and token are used by the network adapter to authenticate the communication with the BMC. In embodiments, additional transactions between the BMC and the network adapter may take place prior to the debug session, some of which will be described below with reference to a second example embodiment.

As mentioned above, the BMC is a bridge between a User and the network adapter. Typically, a user program runs on the remote debug station 110 and communicates with the BMC. In embodiments, the user may be remote, communicating with BMC 108 through the network, for example, by an additional port that is known to be good. The mechanism in which the BMC may access the network is beyond the scope of the present disclosure.

Thus, according to the example embodiment illustrated in FIG. 1, a BMC of the compute node may configure the network adapter to facilitate secure remote debug of the DUT by a remote debug station.

As would be appreciated, the structure of Compute Node 100 described above with reference to g. 1 is cited by way of example. Compute nodes in accordance with the disclosed techniques are not limited to the description hereinabove. In alternative embodiments, for example, network connected devices other than a network adapter, such as GPUs, may be used. In some embodiments, system busses other than PCIE are implemented. In some embodiments, Compute Node 100 may comprise a plurality of CPUs and/or a plurality of network-connected devices. In an embodiment, BMC 108 does not comprise a PCIE interface and, instead, communicates with CPU 102, for example, through a shared memory or through a serial link. In an embodiment, Sideband Interface 118 may comprise a serial bus. In another embodiment, BMC 108 comprises an additional interface (e.g., a serial bus) for directly communicating with a user.

CPU 102 and/or BMC 108 may comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

BMC-DUT Commands and Responses

In embodiments, the BMC sends commands to the DUT, and the DUT sends responses to the commands to the BMC. Both commands and responses are sent on a sideband bus, using, for example, Network Controller Sideband Interface specifications, as defined in "Network Controller Sideband Interface (NC-SI) Specification", referenced above (will be referred hereinbelow as "DSP0222").

We will next describe a set of commands that the BMC may send to the DUT, and a corresponding set of responses that the DUT sends to the BMC, in accordance with an embodiment of the present invention. All commands and responses adhere to the DSP0222 specifications. The commands and responses described herein are cited by way of example; any other suitable set of commands and responses, either adhering or not adhering to the DSP0222 specifications, including (but not limited to) subsets and supersets of the commands and/or responses described herein may be used in alternative embodiments.

We will present the commands and the responses in a tabular form. Each command and each response comprise a plurality of fields. As many of the fields are common to most commands and responses, we will start with a description of the various fields.

1. NC-SI Header—a 16-byte field that stores the Network Controller Sideband Interface protocol header.

2. Manufacturer ID—a 4-byte field that stores a manufacturer-specific ID code.

3. Command-Rev—a single byte field that stores a revision identification of the command.

4. Cmd ID (Command ID)—a single byte field that stores the encoding of the command/response.

5. Parameter—a single byte field that transfer a parameter from the BMC to the DUT (for commands) or from the DUT to the BMC (responses).

6. Response code—a two-byte field that stores a response code (responses only).

7. Reason code—a two-byte field that stores a response-reason code (responses only).

8. Reserved fields—reserved for future expansions.

9. Checksum—a 4-byte code, which may be used to protect commands and responses against communication errors.

10.—Mode—a single byte field, used to describe the mode of network communication. Bit 0 of the mode field defines the Internet Protocol mode (e.g., IPV4 or IPV6); Bit 1 specifies using of Virtual Local Area Network circuit (VLAN) tagging; Bit 2 specifies, if VLAN tagging is indicated by bit 1, a single or a dual (internal and external) VLAN tag; bits 4:3 specify one of four ports; Bit 5 specifies whether debugging of the DUT is enabled; and, Bits 7:3 are reserved for future extensions.

11. Remote MAC address—a six-byte field; stores the 48-bit MAC address of the network peer (e.g., the debug station).

12. VLAN1—a two-byte field that identifies a VLAN Tag, or, if dual VLAN tag is indicated, identifies the external VLAN Tag.

13. VLAN2—a two-byte field that identifies the internal VLAN Tag, when dual VLAN tag is indicated.

14. Network-Connected Device IPv4 Address—a 4-byte field that stores the IPV4 address of the DUT.

15. Remote IPv4 Address—a 4-byte field that stores the IPV4 address of the debug station.

16. Network-Connected Device IPv6 Address—a 16-byte field that stores the IPV6 address of the DUT.

17. Remote Adapter IPv6 Address—a 16-byte field that stores the IPV6 address of the debug station.

18. UDP Source Port—a 2-byte field that stores the DUT side UDP source port.

19. UDP Destination Port—a 2-byte field that stores the DUT side UDP destination port.

In embodiments, five pairs of commands/responses are used: Get Network Debug Info, Set Network Debug Info, Get Debug Mode, Get Challenge and Set Token. The structure of the five pairs according to an embodiment will be described below.

1. Get Challenge Command/Response

In embodiments, to ensure secure enabling of a debug session, a challenge-response protocol is used. The network-connected device authenticates the user by sending a Challenge and checking that response that the user sends back (will be referred to herein as "token") corresponds to the challenge. The challenge typically comprises a random number, and the token is typically generated from the challenge and a key using. For better security, the DUT may change the challenge at least with every invocation of a debug session; in an embodiment, the DUT changes the challenge for each Get Challenge Command. An example to a Challenge-Response usage can be found in U.S. Pat. No. 6,377,691, which discloses disclosed system that uses a challenge-response authentication protocol for datagram-based remote procedure calls.

To get a challenge from the DUT, the BMC sends a Get Challenge Command, as described in Table 1:

TABLE 1

Get Challenge Command

| Byte/Bits | 31:24 | 23:16 | 15:8 | 7:0 |
|---|---|---|---|---|
| 0 . . . 15 | NC-SI Header | | | |
| 16:19 | Manufacturer ID | | | |
| 20:23 | Command rev | Mfr. Cmd ID | Parameter | Reserved |
| 24:27 | PHY address | Register | Operation | Reserved |
| 28:31 | Checksum 31:0 | | | |

The response that the DUT sends to the Get Challenge command is described in Table 2:

TABLE 2

Get Challenge Response

| Byte/Bits | 31:24 | 23:16 | 15:8 | 7:0 |
|---|---|---|---|---|
| 0 . . . 15 | NC-SI Header | | | |
| 16:19 | Response Code | | Reason Code | |
| 20:23 | Manufacturer ID | | | |
| 24:27 | Command rev | Mfr. Cmd ID | Parameter | Reserved |
| 28:35 | Challenge | | | |
| 36:39 | Checksum 31:0 | | | |

2. Set Token Command/Response

Responsive to the challenge, the BMC sends a token to the DUT, as described in Table 3:

TABLE 3

Set Token Command

| Byte/Bits | 31:24 | 23:16 | 15:8 | 7:0 |
|---|---|---|---|---|
| 0 . . . 15 | NC-SI Header | | | |
| 16:19 | Manufacturer ID | | | |
| 20:23 | Command rev | Mfr. Cmd ID | Parameter | Reserved |
| 24:27 | Reserved | | Length | |
| 28:28+length | Token | | | |
| 29+length:32+length | Checksum 31:0 | | | |

The length of the token is defined within the command and, hence, the length of the command is variable.

The DUT responds to the Set Token Command by a Set Token Response, as described in Table 4:

TABLE 4

Set Token Response

| Byte/Bits | 31:24 | 23:16 | 15:8 | 7:0 |
|---|---|---|---|---|
| 0 . . . 15 | NC-SI Header | | | |
| 16:19 | Response Code | | Reason Code | |
| 20:23 | Manufacturer ID | | | |
| 24:27 | Command rev | Mfr. Cmd ID | Parameter | Reserved |
| 28:35 | Checksum 31:0 | | | |

The Response Code indicates a Fail or a Pass. In case of a Fail, the Reason Code field indicates whether the token is invalid, or the previous token has not been invalidated.

3. Get Debug Mode Info Command/Response

The BMC inquires the debug status of the DUT, using a Get Debug Mode Info Command, as described in Table 5:

TABLE 1

Get Debug Info Command

| Byte/Bits | 31:24 | 23:16 | 15:8 | 7:0 |
|---|---|---|---|---|
| 0 . . . 15 | NC-SI Header | | | |
| 16:19 | Manufacturer ID | | | |
| 20:23 | Command rev | Mfr. Cmd ID | Parameter | Reserved |
| 24:27 | Checksum 31:0 | | | |

In response, the DUT sends to the BMC a Get Debug Mode Info Response, as described in Table 6:

TABLE 2

Get Debug Info Response

| Byte/Bits | 31:24 | 23:16 | 15:8 | 7:0 |
|---|---|---|---|---|
| 0 . . . 15 | NC-SI Header | | | |
| 16:19 | Response Code | | Reason Code | |
| 20:23 | Manufacturer ID | | | |
| 24:27 | Command rev | Mfr. Cmd ID | Parameter | Reserved |
| 28:31 | Reserved | | | Response |
| 32:35 | Reserved | | | |
| 36:39 | Checksum 31:0 | | | |

The single-byte response bit comprises:

Bit 0—General FW (0) or Debug FW (1) is used.

Bit 1—A Debug Token is active (1) or inactive (0).

Bit 2—A Customer Token, (which may be used for authentication that is not related to debug) is active (1) or inactive (0).

Bit 3—Challenge (as described above); 0: No challenge was provided; 1: a challenge was provided and was not yet used in a token.

Bit 4—Inter-Integrated-Circuit (I2C) debug enabled (1) or disabled (0).

Bits 7:5 are a Reserved field.

4. Get Network Debug Info Command/Response

The BMC requests information pertaining to the network debug status of the DUT, as described in Table 7:

TABLE 7

Get Network Debug Info Command

| Byte/Bits | 31:24 | 23:16 | 15:8 | 7:0 |
|---|---|---|---|---|
| 0 . . . 15 | NC-SI Header | | | |
| 16:19 | Manufacturer ID | | | |
| 20:23 | Command rev | Cmd ID | Parameter | Reserved |
| 24:27 | Checksum 31:0 | | | |

The DUT responds with the network parameters, as described in Table 8:

TABLE 8

Get Network Debug Info Response

| Byte/Bits | 31:24 | 23:16 | 15:8 | 7:0 |
|---|---|---|---|---|
| 0 . . . 15 | NC-SI Header | | | |
| 16:19 | Response Code | | Reason Code | |
| 20:23 | Manufacturer ID | | | |
| 24:27 | Command rev | Mfr. Cmd ID | Parameter | Mode |
| 28:31 | Remote MAC Address B 5 | Remote MAC Address B 4 | Remote MAC Address B 3 | Remote MAC Address B 2 |

TABLE 8-continued

Get Network Debug Info Response

| Byte/Bits | 31:24 | 23:16 | 15:8 | 7:0 |
|---|---|---|---|---|
| 32:35 | Remote MAC Address B 1 | Remote MAC Address B 0 | VLAN1 | |
| 36:39 | VLAN2 | | | Reserved |
| 40:43 | Network-Connected Device IPv4 Address | | | |
| 44:47 | Remote IPv4 Address | | | |
| 48:63 | Network-Connected Device IPV6 Address | | | |
| 64:79 | Remote IPv6 Address | | | |
| 80:83 | UDP Source Port | | UDP Destination Port | |
| 84:87 | Checksum 31:0 | | | |

5. Set Network Debug Info Command/Response

The CPU sets the network debug parameters of the DUT, as described in Table 9:

TABLE 9

Set Network Debug Info

| Byte/Bits | 31:24 | 23:16 | 15:8 | 7:0 |
|---|---|---|---|---|
| 0 . . . 15 | NC-SI Header | | | |
| 16:19 | Manufacturer ID | | | |
| 20:23 | Command rev | Mfr. Cmd ID | Parameter | Mode |
| 24:27 | Remote MAC Address B 5 | Remote MAC Address B 4 | Remote MAC Address B 3 | Remote MAC Address B 2 |
| 28:31 | Remote MAC Address B 1 | Remote MAC Address B 0 | VLAN1 | |
| 32:35 | VLAN2 | | | Reserved |
| 36:39 | Network-Connected Device IPv4 Address | | | |
| 40:43 | Remote IPv4 Address | | | |
| 44:59 | Network-Connected Device IPv6 Address | | | |
| 60:75 | Remote IPv6 Address | | | |
| 76:79 | UDP Source Port | | UDP Destination Port | |
| 80:83 | Checksum 31:0 | | | |

The DUT sends a response to the Set Network Debug Info Command, as described in Table 10:

TABLE 10

Set Network Debug Info Response

| Byte/Bits | 31:24 | 23:16 | 15:8 | 7:0 |
|---|---|---|---|---|
| 0 . . . 15 | NC-SI Header | | | |
| 16:19 | Response Code | | Reason Code | |
| 20:23 | Manufacturer ID | | | |
| 24:27 | Command rev | Mfr. Cmd ID | Parameter | Reserved |
| 28:31 | Checksum 31:0 | | | |

Figure 2:
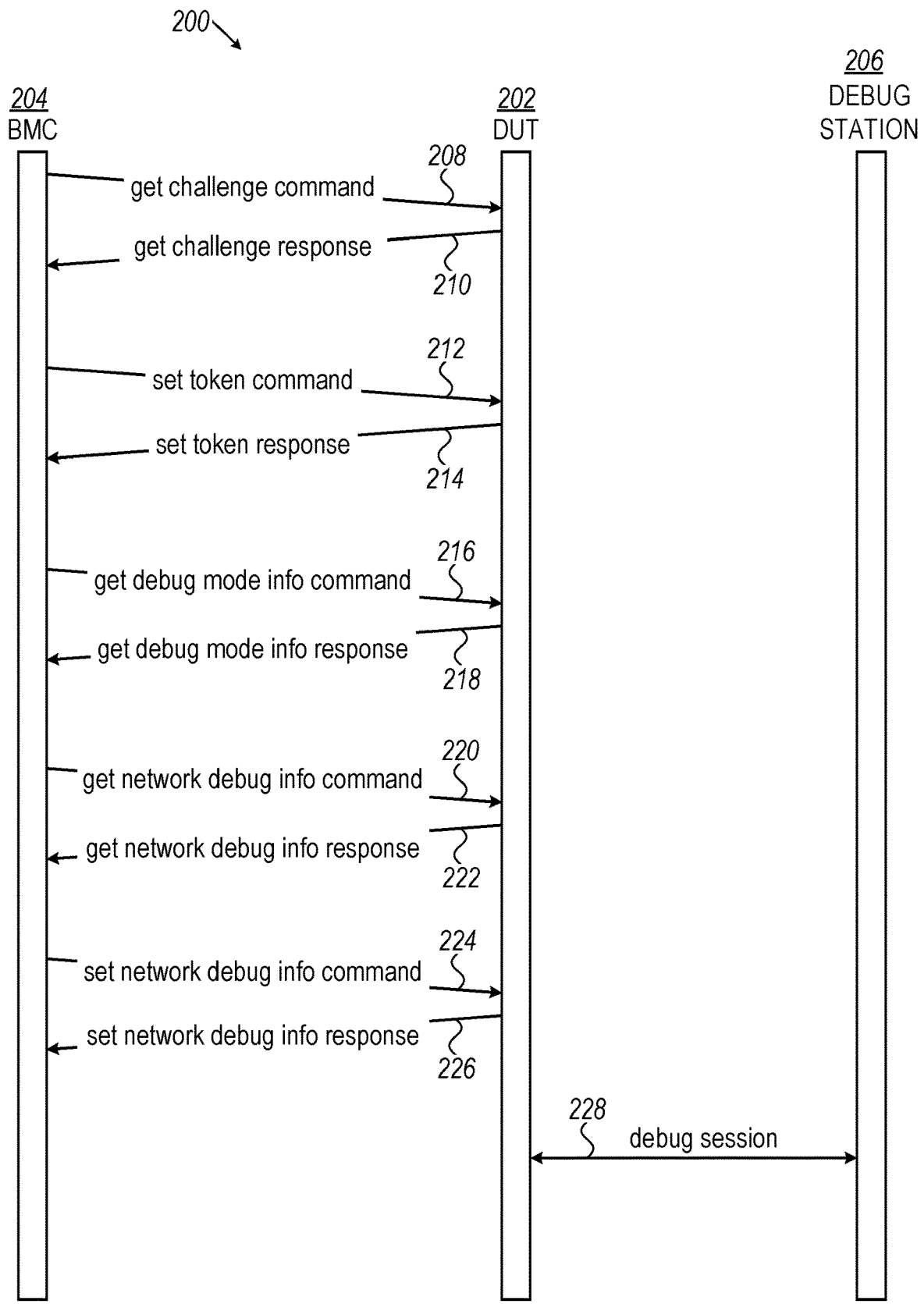
FIG. 2 is a sequence chart that schematically illustrates a method for secure enabling of a debug session, in accordance with an embodiment of the present invention.

FIG. 2 is a sequence chart 200 that schematically illustrates a method for secure enabling of a debug session, in accordance with an embodiment of the preset invention. The sequence chart describes communication between a BMC 204, a Device-Under-Test (DUT) 202 and a Debug Station 206, using the commands and responses described hereinabove. BMC 204 may be similar or identical to BMC 108, DUT 202 may comprise Network Adapter 100 and Debug Station 206 may similar or identical to Debug Station 110 (FIG. 1).

The sequence starts at a Get Challenge Command 208, wherein the BMC requests a challenge from the DUT (Table 1). The DUT then, in a Get Challenge Response 210, sends a response which comprises the challenge to the BMC (Table 2).

The DUT sends the challenge to authenticate the debug session initiator (user) (by verifying that the received token corresponds to the challenge) prior to the remote debug station. In an embodiment, the BMC communicates the challenge using an additional network port (not shown in FIG. 1) to communicate with a remote user (in other embodiments, other suitable techniques may be used to authenticate the remote user).

The BMC then in a Set Token step 212, sends the token to the DUT (Table 3), and the DUT responds in a Set Token Response step 214 (Table 4).

If the set-token command succeeds (indicated in the response code of the Set Token response), the user is authenticated, and the BMC may proceed to communicate debug information and parameters with the DUT (in embodiments, the DUT is configured to ignore further BMC debug-related communication if the authentication fails). According to the example embodiment illustrated in FIG. 2, the BMC first reads the debug info parameters from the DUT, then reads the network debug parameters and, lastly, sets new set of network debug parameters.

In a Get Debug Mode Info Command step 216, the BMC queries the debug mode parameters from the DUT (Table 5), which responds in a Get Debug Mode Info Response step 218 (Table 6). Next, in a Get Network Debug Info Command step 220 (Table 7), the BMC queries the debug network parameters from the BMC, which responds in a Get Network Debug Info Response step 222 (Table 8).

At this point, the user determines the network debug parameters of the debug session and sends the parameters to the BMC. The BMC forwards the parameters to the DUT in a Set Network Debug Info Command step 224 (Table 9). The DUT responds in a Set Network Debug Info Response step 226 (Table 10).

At this point, a debug session 228 commences, between DUT 104 and Debug Station 110, over network 106 (FIG. 1).

As would be appreciated, the debug session initiation sequence described above with reference to FIG. 2 is cited by way of example. Sequences in accordance with the disclosed techniques are not limited to the description hereinabove. In alternative embodiments, for example, the debug info is not inquired in every session, and may be stored in a random-access memory (RAM) after accessed for the first time. In embodiments, Get Network Info command and responses are not needed, and the user sets a new set of network parameters irrespective of the former set being used. In embodiment, Set Network Info command precedes Get Network Info Command, which is used for verification that the parameters have been stored in the network-connected device.

The configuration of compute node 100 including network adapter 104 and BMC 108, and, the method of sequence chart 200 are example configurations and methods that are shown purely for the sake of conceptual clarity. Any other suitable configurations and flowcharts can be used in alternative embodiments.

Elements of BMC 108 and/or network adapter 104 may be implemented using suitable hardware, such as in one or more Application-Specific Integrated Circuits (ASICs) or Field-Programmable Gate Arrays (FPGAs), using software, using hardware, or using a combination of hardware and software elements.

Although the embodiments described herein mainly address network-based debug, the methods and apparatuses described herein can also be used in other applications such as using a sideband interface to enable DUT debug over interfaces other than the said sideband interface.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A compute node, comprising: a network-connected device, configured to communicate with a network; and a baseboard management controller (BMC), which communicates with the network-connected device by a sideband interface, the BMC to communicate one or more parameters via the sideband interface to the network-connected device, to facilitate the network-connected device engaging in a debug session that debugs the network-connected device over the network with a remote debug device.

2. The compute node according to claim 1, wherein the one or more parameters include parameters for connection of the network-connected device with the remote debug device.

3. The compute node according to claim 2, wherein the one or more parameters comprise at least one network parameter selected from a group of network parameters consisting of:
    a physical-layer source address;
    a physical-layer destination address;
    an Internet Protocol (IP) source address;
    an IP destination address;
    a port number; and
    a Virtual Local Area Network (VLAN) parameter.

4. The compute node according to claim 2, wherein the one or more parameters comprise a secure debug-enablement token, for establishing the debug session with the remote debug device.

5. The compute node according to claim 2, further comprising a Central Processing Unit (CPU) that is configured to provide the one or more parameters to the BMC, for sending to the network-connected device.

6. The compute node according to claim 5, wherein the CPU is connected to the network-connected device via a bus, and wherein the BMC is configured to send the one or more parameters to the network-connected device over the sideband interface when the network-connected device is unable to communicate over the bus.

7. The compute node according to claim 1, wherein the BMC is configured to query from the network-connected device a challenge parameter and, responsive to the challenge parameter, to send to the network-connected device a secure debug-enablement token, for establishing the debug session with the remote debug device.

8. The compute node according to claim 7, wherein the BMC is configured to send to the network-connected device a 'set-token' command over the sideband interface, the 'set-token' command including a payload that comprises the secure debug-enablement token.

9. The compute node according to claim 1, wherein the sideband interface comprises at least one of Network Controller Sideband Interface (NC-SI), System Management Bus (SMBus), Reduced media-independent interface (RMII), RMII Based Transport (RBT) and PCIe Bus.

10. A method, comprising:
    in a compute node, communicating with a network using a network-connected device; and
    in the compute node comprising a sideband interface, the network-connected device, and a baseboard management controller (BMC), the BMC communicating one or more parameters via the sideband interface, to the network-connected device, to facilitate the network-connected device engaging in a debug session that debugs the network-connected device over the network with a remote debug device.

11. The method according to claim 10, wherein the one or more parameters include parameters for connection of the network-connected device with the remote debug device.

12. The method according to claim 11, wherein sending the one or more parameters comprises sensing at least one network parameter selected from a group of network parameters consisting of:
    a physical-layer source address;
    a physical-layer destination address;
    an Internet Protocol (IP) source address;
    an IP destination address;
    a port number; and
    a Virtual Local Area Network (VLAN) parameter.

13. The method according to claim 11, wherein sending the one or more parameters comprises sending a secure debug-enablement token, for establishing the debug session with the remote debug device.

14. The method according to claim 11, further comprising providing the one or more parameters to the BMC by a Central Processing Unit (CPU) of the compute node, for sending to the network-connected device.

15. The method according to claim 14, wherein the CPU is connected to the network-connected device via a bus, and wherein configuring the network-connected device by the BMC comprises sending the one or more parameters from the BMC to the network-connected device over the sideband interface when the network-connected device is unable to communicate over the bus.

16. The method according to claim 10, wherein configuring the network-connected device by the BMC comprises querying from the network-connected device a challenge parameter and, responsive to the challenge parameter, sending to the network-connected device a secure debug-enablement token, for establishing the debug session with the remote debug device.

17. The method according to claim 16, wherein sending the secure debug-enablement token comprises sending to the network-connected device a 'set-token' command over the sideband interface, the 'set-token' command including a payload that comprises the secure debug-enablement token.

18. The method according to claim 10, wherein the sideband interface comprises at least one of Network Controller Sideband Interface (NC-SI), System Management Bus (SMBus), Reduced media-independent interface (RMII), RMII Based Transport (RBT) and PCIe Bus.

* * * * *